(12) United States Patent
Kataoka (10) Patent No.: US 11,725,367 B2
(45) Date of Patent: Aug. 15, 2023

(54) COLD WATER DISCHARGE APPARATUS (71) Applicant: SANEI LTD., Osaka (JP)

(72) Inventor: Kensuke Kataoka, Osaka (JP)

(73) Assignee: SANEI LTD., Osaka (JP)

( * ) Notice: Subject to any disclaimer, the term of this patent is extended or adjusted under 35 U.S.C. 154(b) by 481 days.

(21) Appl. No.: 17/052,018

(22) PCT Filed: Mar. 18, 2020

(86) PCT No.: PCT/JP2020/011964
§ 371 (c)(1),
(2) Date: Oct. 30, 2020

(87) PCT Pub. No.: WO2021/157101
PCT Pub. Date: Aug. 12, 2021

(65) Prior Publication Data
US 2023/0151590 A1 May 18, 2023

(30) Foreign Application Priority Data
Feb. 5, 2020 (JP) .................. 2020-017716

(51) Int. Cl.
*E03B 7/04* (2006.01)
*A47K 3/28* (2006.01)
(Continued)

(52) U.S. Cl.
CPC .............. *E03B 7/045* (2013.01); *A47K 3/28* (2013.01); *E03C 1/0408* (2013.01); *F16K 31/002* (2013.01); *E03C 2001/026* (2013.01)

(58) Field of Classification Search
CPC ............................ E03B 7/045; F16K 31/002
See application file for complete search history.

(56) References Cited

U.S. PATENT DOCUMENTS 9,863,647 B1 * 1/2018 McNamara ......... F24D 17/0078
10,967,390 B2 * 4/2021 Lord ..................... B05B 1/18
(Continued)

FOREIGN PATENT DOCUMENTS

CN 1860319 A 11/2006
EP 1669650 A1 6/2008
(Continued)

OTHER PUBLICATIONS

PCT ISR for PCT/JP2020/011964, dated Jun. 2, 2020, 3 pages.
(Continued)

*Primary Examiner* — Reinaldo Sanchez-Medina
(74) *Attorney, Agent, or Firm* — Patterson Thuente IP (57) ABSTRACT A cold water discharge apparatus, for discharging water from an outlet port when feed water is hot and from a cold water discharge port when the feed water is cold, includes a temperature-sensitive first switching valve body and a diaphragm-type second switching valve body. The first switching valve body is configured to open/close a cold water discharge flow channel depending on temperature. The second switching valve body is configured to open a discharge flow channel due to the pressure caused by the flow of hot water through the discharge flow channel. The second switching valve body is configured to close the discharge flow channel due to the pressure caused by the flow of the cold water through the cold water discharge flow channel. The second switching valve body is configured to discharge residual water from the cold water discharge flow channel after stopping water has cooled down.

19 Claims, 9 Drawing Sheets (51) Int. Cl.
  *F16K 31/00*  (2006.01)
  *E03C 1/04*  (2006.01)
  *E03C 1/02*  (2006.01)

(56) References Cited

U.S. PATENT DOCUMENTS

2007/0119989 A1    5/2007  Nagano et al.
2009/0293961 A1*  12/2009  McMurtry .............. E03B 7/045
                                                        137/337

FOREIGN PATENT DOCUMENTS

| JP | H03-18332 A | 1/1991 |
| JP | 2005-127499 | 5/2005 |
| JP | 2006-283274 A | 10/2006 |
| WO | WO 2005/031203 A1 | 7/2005 |

OTHER PUBLICATIONS

PCT WO/ISA for PCT/JP2020/011964, dated Jun. 2, 2020, 3 pages.
English translation of IPRP/WO-ISA for PCT/JP2020/011964, dated Jun. 2, 2020, 4 pages.

\* cited by examiner

COLD WATER DISCHARGE APPARATUS

CROSS-REFERENCE TO RELATED APPLICATIONS

The present application is a U.S. National Phase entry of, and claims priority to, PCT Application No. PCT/JP2020/011964, filed Mar. 18, 2020, which claims priority to Japanese Patent Application No. 2020-017716, filed Feb. 5, 2020, both of which are incorporated herein by reference in their entireties for all purposes.

FIELD OF THE INVENTION

The present disclosure relates to a cold water discharge apparatus. For example, the apparatus serves to discharge hot water to a downstream outlet port when the feed water is hot water having temperature equal to or higher than a preset temperature. The apparatus discharges cold water to a cold water discharge port when the feed water is cold water having a temperature below the preset temperature.

BACKGROUND OF THE INVENTION

A shower facility that is configured to spew out temperature-controlled hot and cold water on a user is conventionally known. For example, the shower facility according to Japanese Laid-Open Patent Publication No. H03-18332 is capable of discharging initial cold water within piping to the outside. A temperature-sensitive valve is embedded in the cold water discharge apparatus. The temperature-sensitive valve serves to switch a flow destination of the water to various discharge flow channels by expanding/contracting in response to changes in temperature.

In the above shower facility, a temperature-sensitive valve is provided so as to expand/contract along a pipe axis direction of a discharge flow channel, so as to prevent the apparatus from increasing in size. Further, the discharge flow channel is configured to have a narrow diameter extending along the temperature-sensitive valve in the pipe axis direction. This discharge flow channel is within a narrow gap between the temperature-sensitive valve and an outer case and passes across the middle of the temperature-sensitive valve. Because of the above configuration, the discharge flow channel, whose flow destination may be switched by the temperature-sensitive valve, is also configured to have a narrow diameter. Therefore, it is not possible to ensure a sufficient discharge flow rate of hot water and a sufficient discharge flow rate of cold water. Accordingly, there has conventionally been a need for a cold water discharge apparatus capable of ensuring an appropriate discharge rate of both hot water and the cold water, while preventing the apparatus from increasing in size.

SUMMARY OF THE INVENTION

A cold water discharge apparatus according to one embodiment of the present disclosure is configured to discharge hot water from a discharge flow channel to an outlet port when the feed water is hot water having a temperature equal to or higher than a preset temperature. The cold water discharge apparatus discharges cold water from a cold water discharge flow channel, which is branched off from the discharge flow channel, to a cold water discharge port when the feed water is cold water having a temperature below the preset temperature. A temperature-sensitive first switching valve body is provided at a branching section of the discharge flow channel and the cold water discharge flow channel. A diaphragm type second switching valve body is provided so as to extend between the discharge flow channel and the cold water discharge flow channel. The diaphragm is biased by a spring force in a direction to close the discharge flow channel.

The temperature-sensitive first switching valve body serves to open the cold water discharge flow channel by expanding/contracting in the pipe axis direction in response to a change in temperature of the feed water such that the feed water is cold water, while keeping the discharge flow channel constantly open. The first switching valve body closes the cold water discharge flow channel when the feed water is hot water. A diaphragm type second switching valve body can be switched between a hot water discharge mode, a cold water discharge mode, and a residual water discharge mode.

In the hot water discharge mode, the discharge flow channel opens due to the pressure caused by flow of hot water through the discharge flow channel, so that hot water is discharged to the outlet port. In the cold water discharge mode, the discharge flow channel closes due to the pressure caused by flow of cold water through the cold water discharge flow channel, so that cold water is discharged to the cold water discharge port. In the residual water discharge mode, the cold water discharge flow channel opens when the temperature of residual water in the first switching valve is below the preset temperature after stopping the water. Consequently, the discharge flow channel opens by being subjected to the pressure due to the gravity drop from the residual water on the downstream side of the outlet port, so that residual water is discharged through the cold water discharge flow channel.

With the above structure, since the first switching valve body constantly opens the discharge flow channel, the discharge flow channel can be ensured to be wide. Further, the second switching valve body can close the discharge flow channel when the feed water is cold water. In addition, the second switching valve body can open the discharge flow channel when discharging cold residual water from the cold water discharge apparatus. With this valve mechanism, it is possible to obtain a structure capable of appropriately ensuring the hot water discharge rate and the cold water discharge rate, while also preventing the cold water discharge apparatus from increasing in size.

Further, the cold water discharge apparatus according to one embodiment of the present disclosure may be further configured as will be described below. The branching section may be formed with a branch pipe configured to take in a portion of the feed water flowing from a supply port of the feed water to the discharge flow channel, and branch off to the cold water discharge flow channel. With the above structure, a constantly opened discharge flow channel can be ensured to be wide.

Further, the cold water discharge apparatus according to one embodiment of the present disclosure may further be configured as will be described below. A constant flow valve may be provided in a region downstream of a pressure chamber of the second switching valve body, the pressure chamber being in the cold water discharge flow channel. With the above structure, an appropriate pressure is applied in the pressure chamber of the second switching valve body by the constant flow valve when discharging cold water, so as to properly close the discharge flow channel.

DETAILED DESCRIPTION

A structure of a cold water discharge apparatus 10 according to one embodiment will be described with reference to FIG. 1 to FIG. 9. In the following description, the directions, such as frontward, rearward, upward, downward leftward, and rightward, refer to the respective directions as indicated in each of the drawings.

Figure 1:
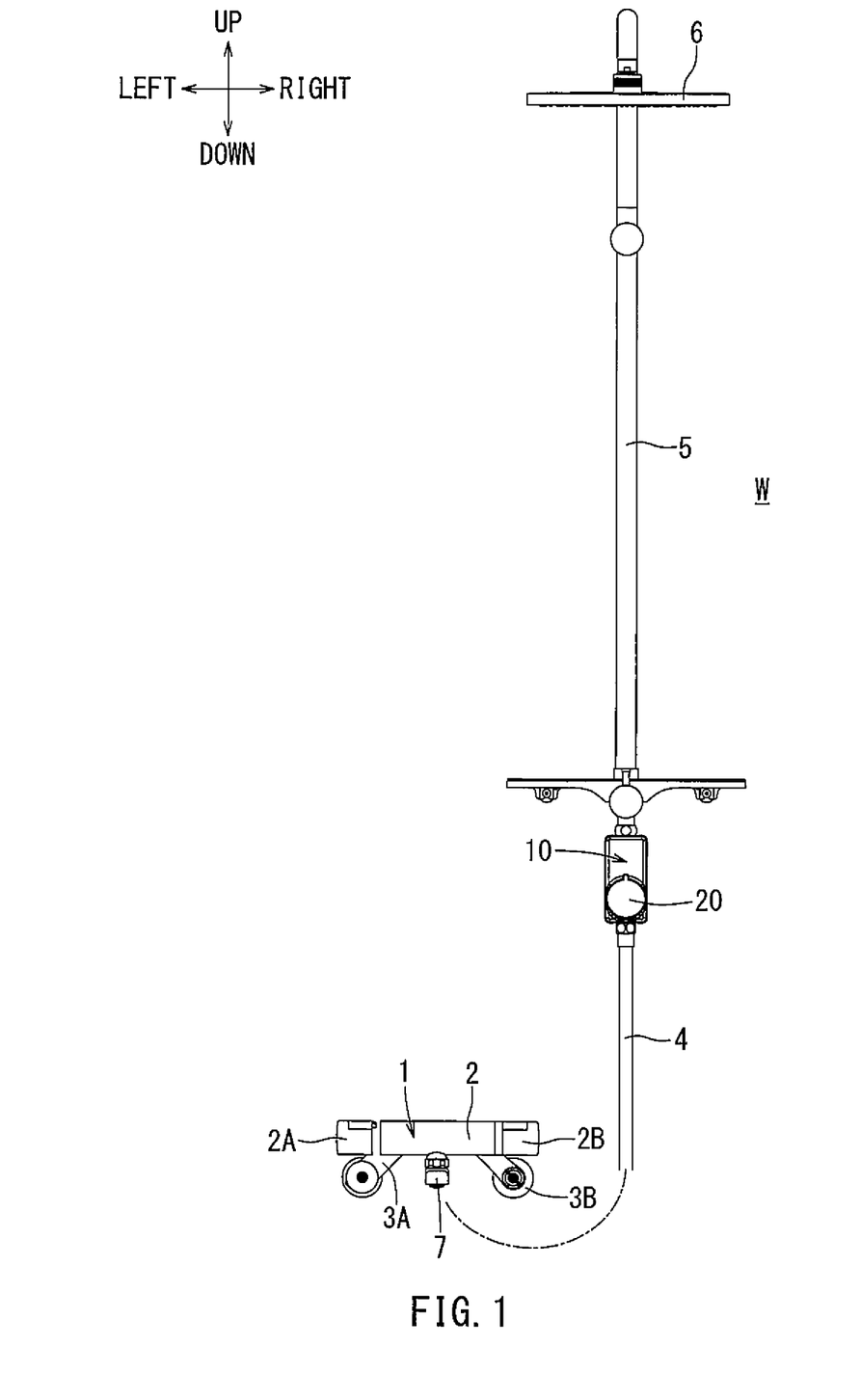
FIG. 1 is a front view illustrating a schematic structure of a cold water discharge apparatus according to one embodiment.

As shown in FIG. 1, a combination faucet 1 is mounted on a wall surface W of a bathroom. A cold water discharge apparatus 10 is provided on a channel for supplying hot and cold water from the combination faucet 1 to an overhead type shower head 6. Specifically, the cold water discharge apparatus 10 is disposed at a connecting part between a shower supply pipe 4, which fluidly connects with the combination faucet 1 and extends upward from the combination faucet 1, and a shower discharge pipe 5 that fluidly connects with the shower supply pipe 4 and extends upward from the shower supply pipe 4. An upper end of the shower discharge pipe 5 is connected to the shower head 6.

The combination faucet 1 is equipped with a function that allows hot and cold water supplied from behind the wall surface W of the bathroom to be mixed in the interior and to be discharged. More specifically, pipe forming channels for hot and cold water (not shown) may be provided in or behind the wall surface W of the bathroom. On the rear surface of a faucet body 2, hot and cold water connection ports (not shown) are formed respectively. The hot and cold water connection ports of the faucet body 2 are fluidly connected with the respective pipes via a hot water supply pipe 3A or a cold water supply pipe 3B which are eccentric in the shape of a crank.

The combination faucet 1 may be equipped with a temperature control function that allows the mixing ratio of the supplied hot and cold water to be controlled internally. Further, the combination faucet 1 includes a switching function capable of switching a delivery stopping channel for the mixed hot and cold water, and an adjustment function capable of adjusting a discharge amount of hot and cold water to be discharged.

The adjustment of the mixing ratio of the hot and cold water may be performed by operating a substantially cylindrical temperature control handle 2A attached to a side (for example, left side) of the faucet body 2. Further, the switching of the channel for discharging/stopping water and adjustment of a discharge rate may be performed by operating a substantially cylindrical switching handle 2B attached to a side (for example, right side) of the faucet body 2. Specifically, a mixing ratio of the hot and cold water to be mixed within the faucet body 2 is adjusted to a preset temperature in accordance with a rotation position as a user rotates the temperature control handle 2A to the desired rotation position.

The user may rotate the switching handle 2B upward or downward from a predetermined water stopping position (not shown). This enables the faucet body 2 to selectively discharge hot or cold water at an amount corresponding to the amount of rotation movement of the switching handle 2B to the shower head 6 or spout 7, which are fluidly connected to the faucet body 2. In the present embodiment, the hot or cold water is discharged from the shower head 6 when the switching handle 2B is rotated upward. The hot or cold water is discharged from the spout 7 when the switching handle 2B is rotated downward.

The cold water discharge device 10 is equipped with a function that allows the cold water in the piping to be discharged outside, so that the cold water remaining in the piping at the beginning of use does not spew out through the shower head 6 on the user, for instance when hot or cold water is to be discharged from the shower head 6 by operating the switching handle 2B. Hereinafter, a specific structure of the cold water discharge apparatus 10 will be described in detail.

Figure 2:
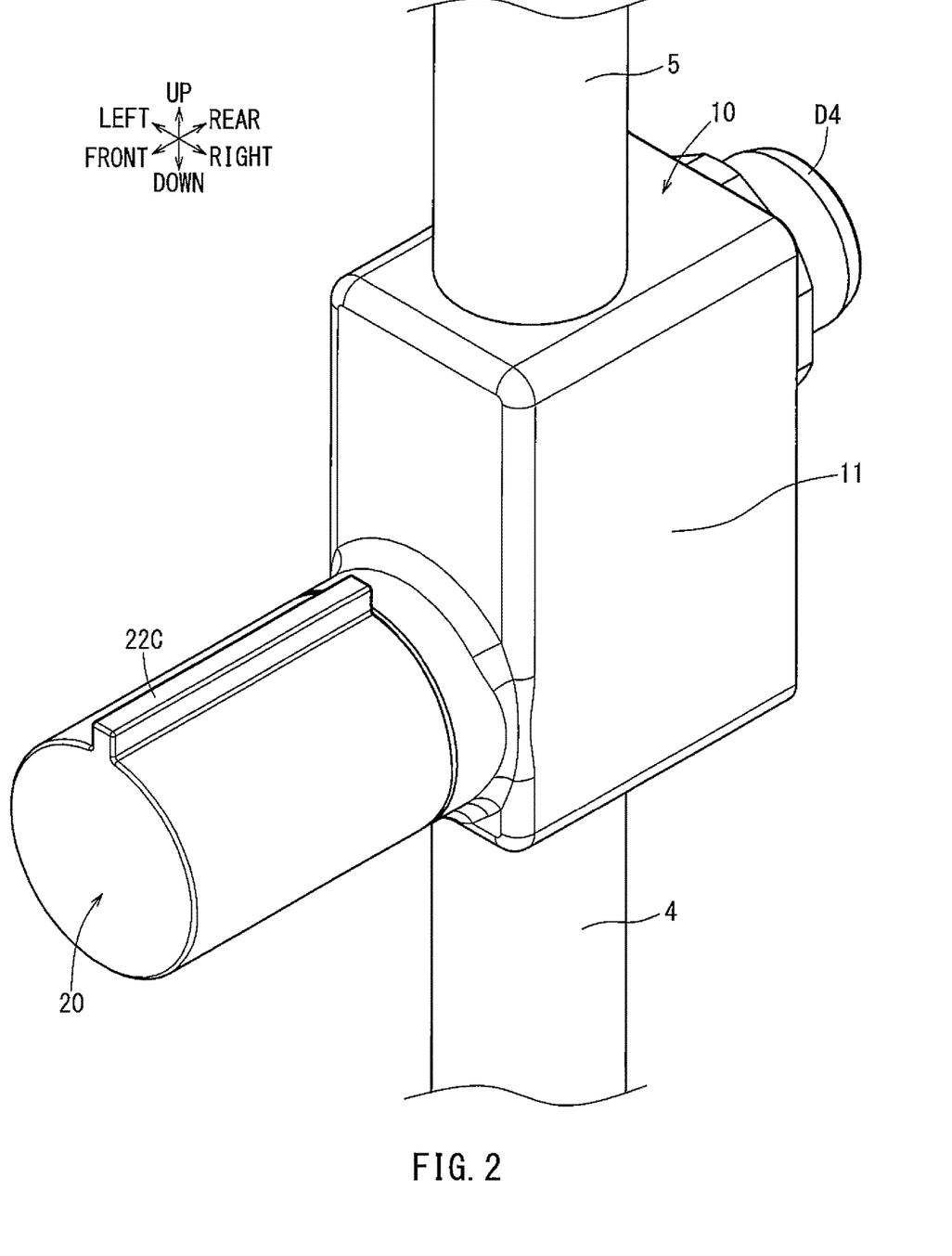
FIG. 2 is a perspective view of the cold water discharge apparatus.

As shown in FIG. 2, the cold water discharge apparatus 10 is formed in substantially a box shape vertically elongated in a frontward/rearward direction. An upper end of the shower supply pipe 4 is fluidly connected to a lower end of the cold water discharge apparatus 10, while a lower end of the shower discharge pipe 5 is connected to an upper end of the cold water discharge apparatus 10. The upper end of the shower supply pipe 4 and the lower end of the shower discharge pipe 5 are fluidly connected to the cold water discharge apparatus 10 in a position so as to be aligned with each other on the same axis.

Figure 3:
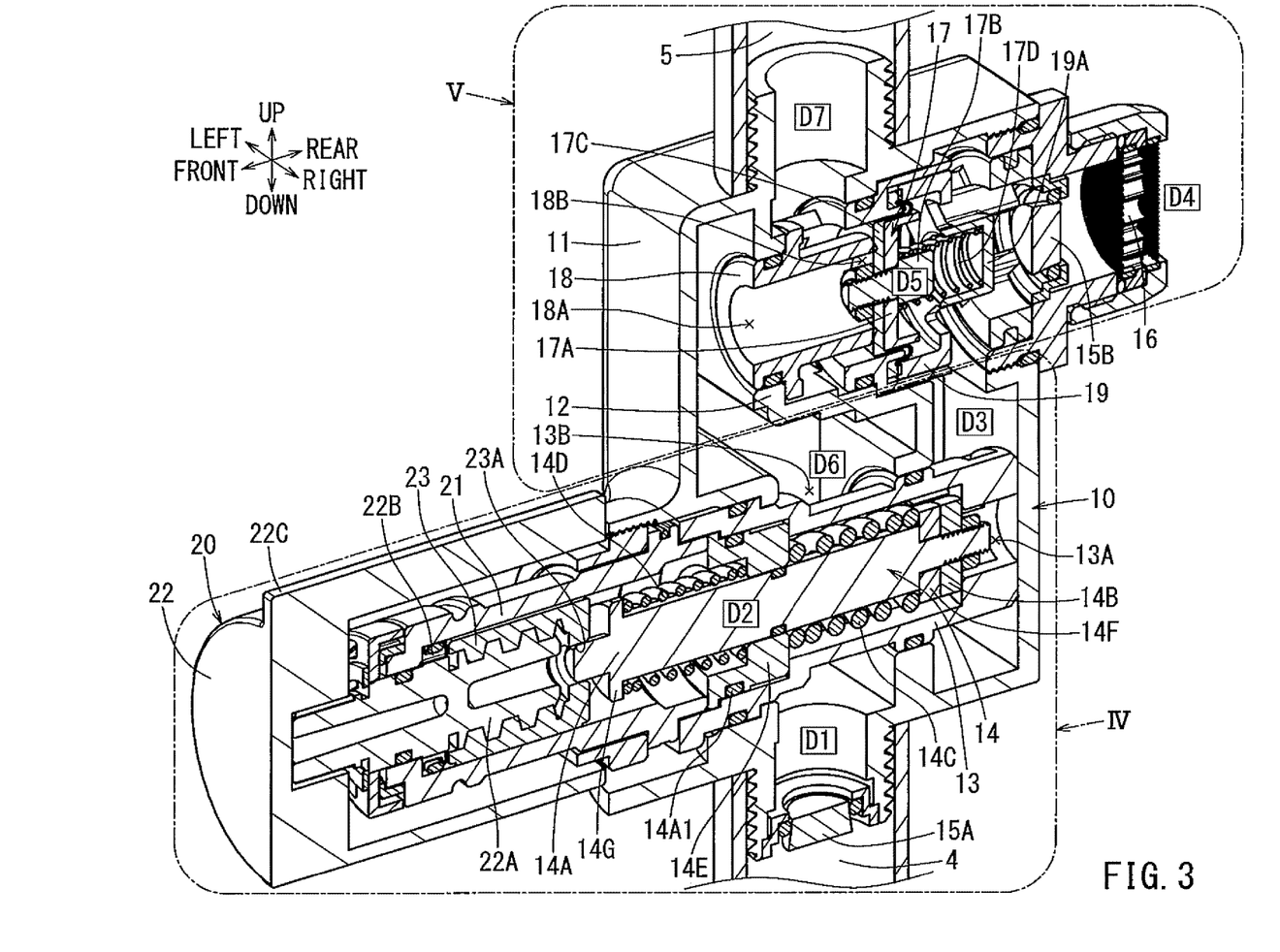
FIG. 3 is a partial perspective cross-sectional view illustrating an interior structure of the cold water discharge apparatus.

The cold water discharge apparatus 10 has an apparatus main body 11, which may be formed as a vertically elongated box shape, as shown in FIG. 3. A plurality of flow channels are formed by providing a plurality of compartment walls 12 and pipes inside the apparatus main body 11. In the following description, the main pipes provided in the cold water discharge apparatus 10 will be described with reference numerals while other pipes will be described without reference numerals. Channels or openings defined by the respective pipes will be denoted with a reference numeral to facilitate description. In each figure, each channel or opening provided in the cold water discharge apparatus 10 is indicated with a reference sign enclosed in a square.

As shown in FIG. 3, a downwardly opened supply port D1 is formed at the lower end of the cold water discharge apparatus 10, which is fluidly connected to the upper end of the shower supply pipe 4. An upwardly opened outlet port D7 is formed at the upper end of the cold water discharge apparatus 10, which is fluidly connected to the lower end of the shower discharge pipe 5. A rearwardly opened cold water discharge port D4 configured to discharge cold water to the outside is formed at an upper part of a rear end of the cold water discharge apparatus 10.

Figure 4:
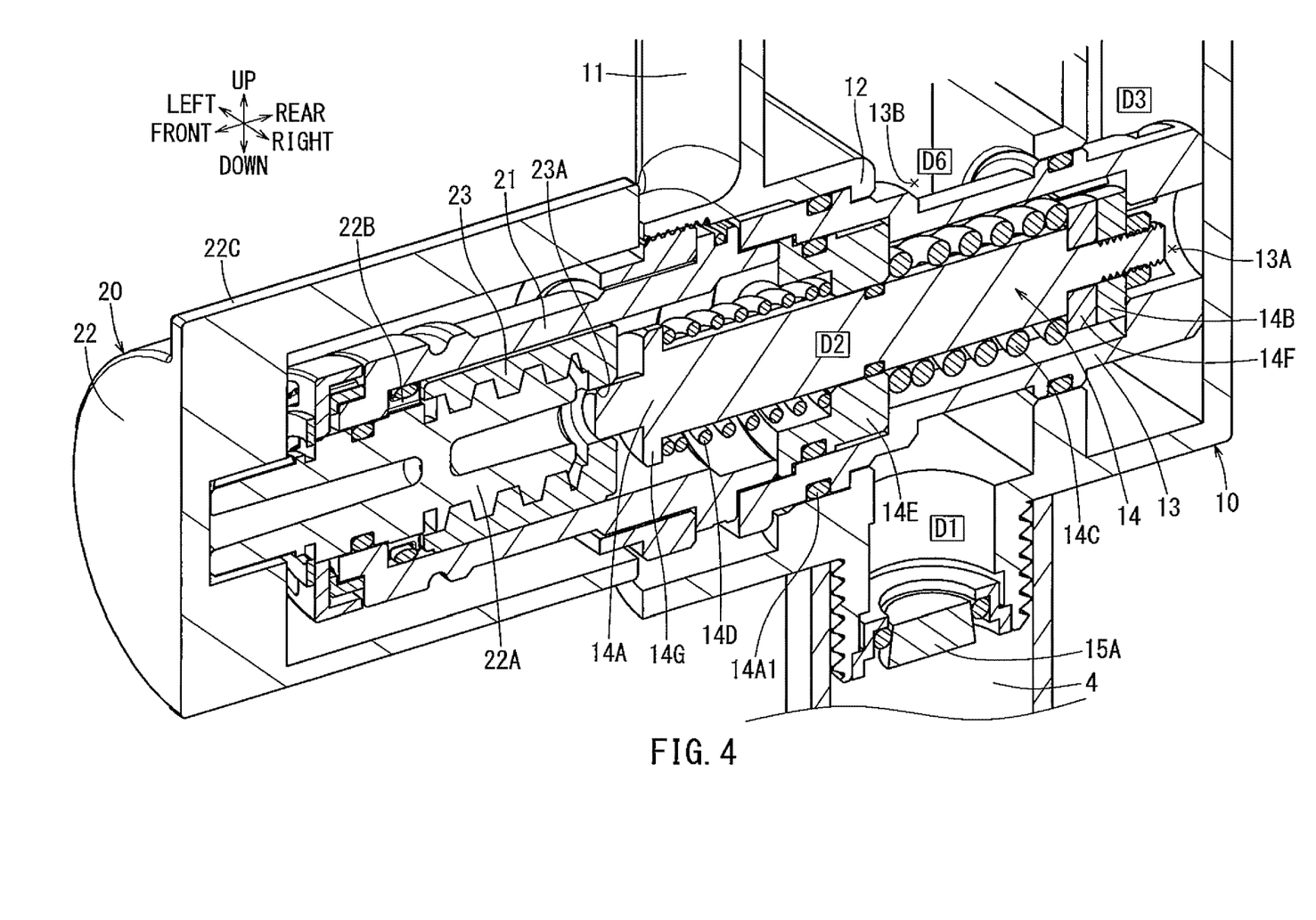
FIG. 4 is an enlarged view of a part IV in FIG. 3.

As shown in FIG. 4, the cold water discharge apparatus 10 may include a branch flow channel D2, which allows a flow channel to branch into upward and rearward channels, at an upper position and downstream of the supply port D1. Further, the cold water discharge apparatus 10 includes a cold water discharge flow channel D3 on a rear side of the branch flow channel D2. As shown in FIG. 3, the cold water discharge flow channel D3 is configured to connect the branch flow channel D2 to the cold water discharge port D4. The cold water discharge flow channel D3 is configured to have a shape in which the flow channel rises upward from the connection port of the flow channel branched on the rear side of the branch flow channel D2 and bends further rearward so as to lead to the cold water discharge port D4.

Figure 5:
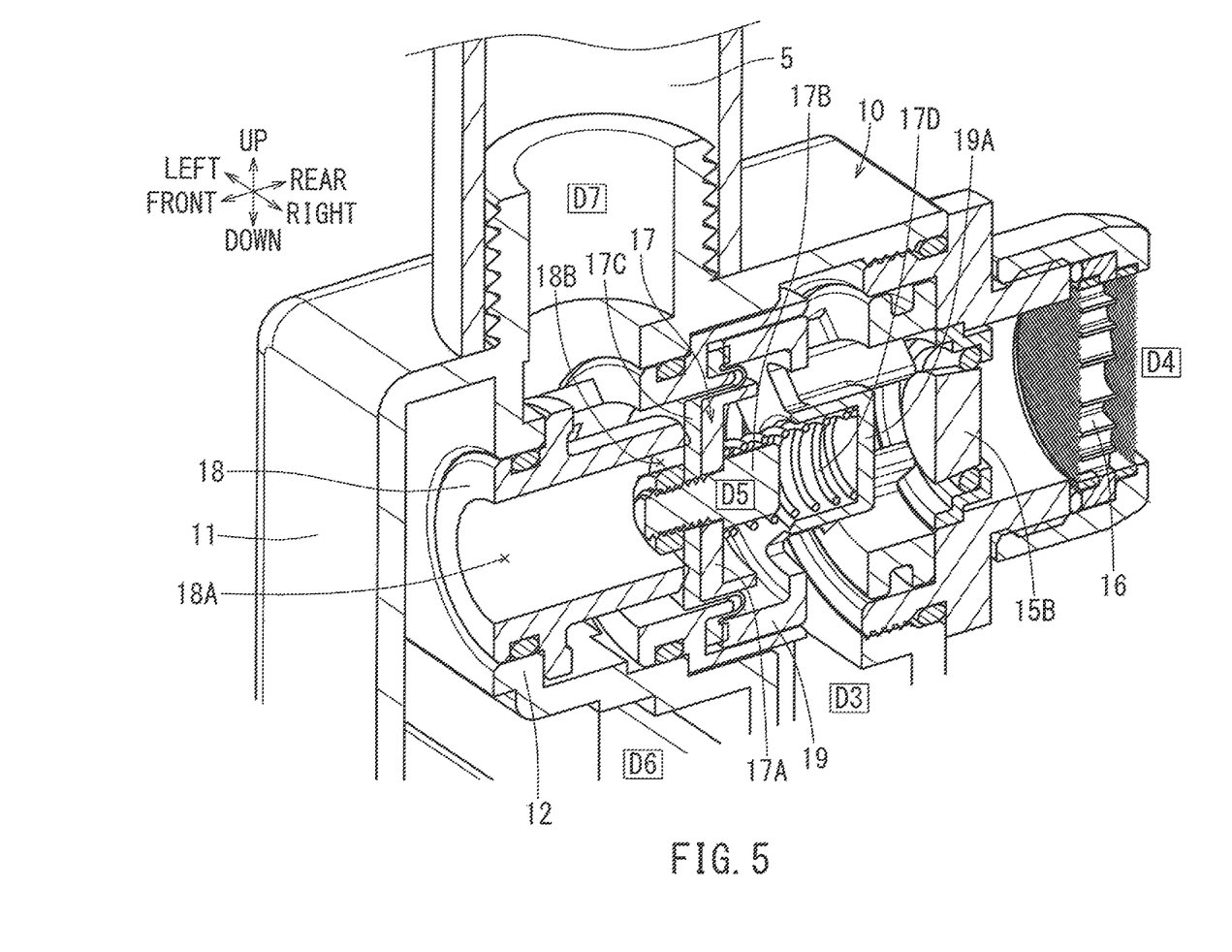
FIG. 5 is an enlarged view of a part V in FIG. 3.

As shown in FIG. 5, a pressure chamber D5, for slightly expanding the flow channel forward, is formed at the bent part of the flow channel, which is the part bent from upward to rearward of the cold water discharge flow channel D3. The pressure chamber D5 is an area for exerting pressure on a diaphragm-type second switching valve body 17 from behind, as will be described later. The pressure chamber D5 may be formed of a partition pipe 19 in the form of a round tube with a pipe axis direction oriented in the frontward/rearward direction.

As shown in FIG. 3, the cold water discharge apparatus 10 includes a discharge flow channel D6, which is connected to the upwardly extending flow channel of the branch flow channel D2 and leads to the upper outlet port D7. A part in the middle of the flow channel of a discharge flow channel D6 that extends to the outlet port D7 may be closed, so as to not allow a flow therethrough, or may be opened, so as to allow a flow therethrough, by the second switching valve 17, which will be described later. The cold water discharge port D4 may be provided in a position lower than the outlet port D7.

Figure 6:
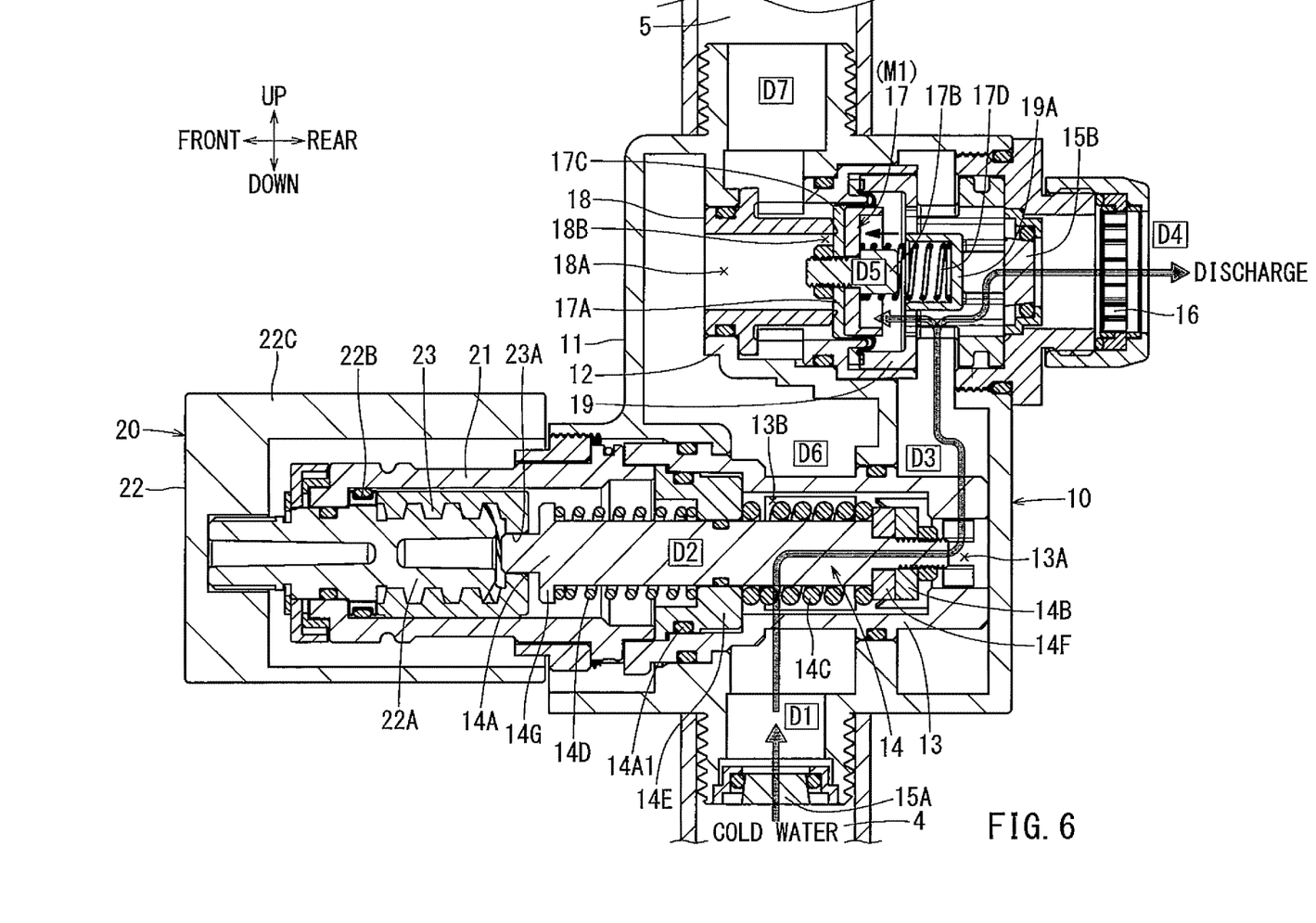
FIG. 6 is a cross-sectional view corresponding to FIG. 3 illustrating a state of each valve during cold water supply.
Figure 7:
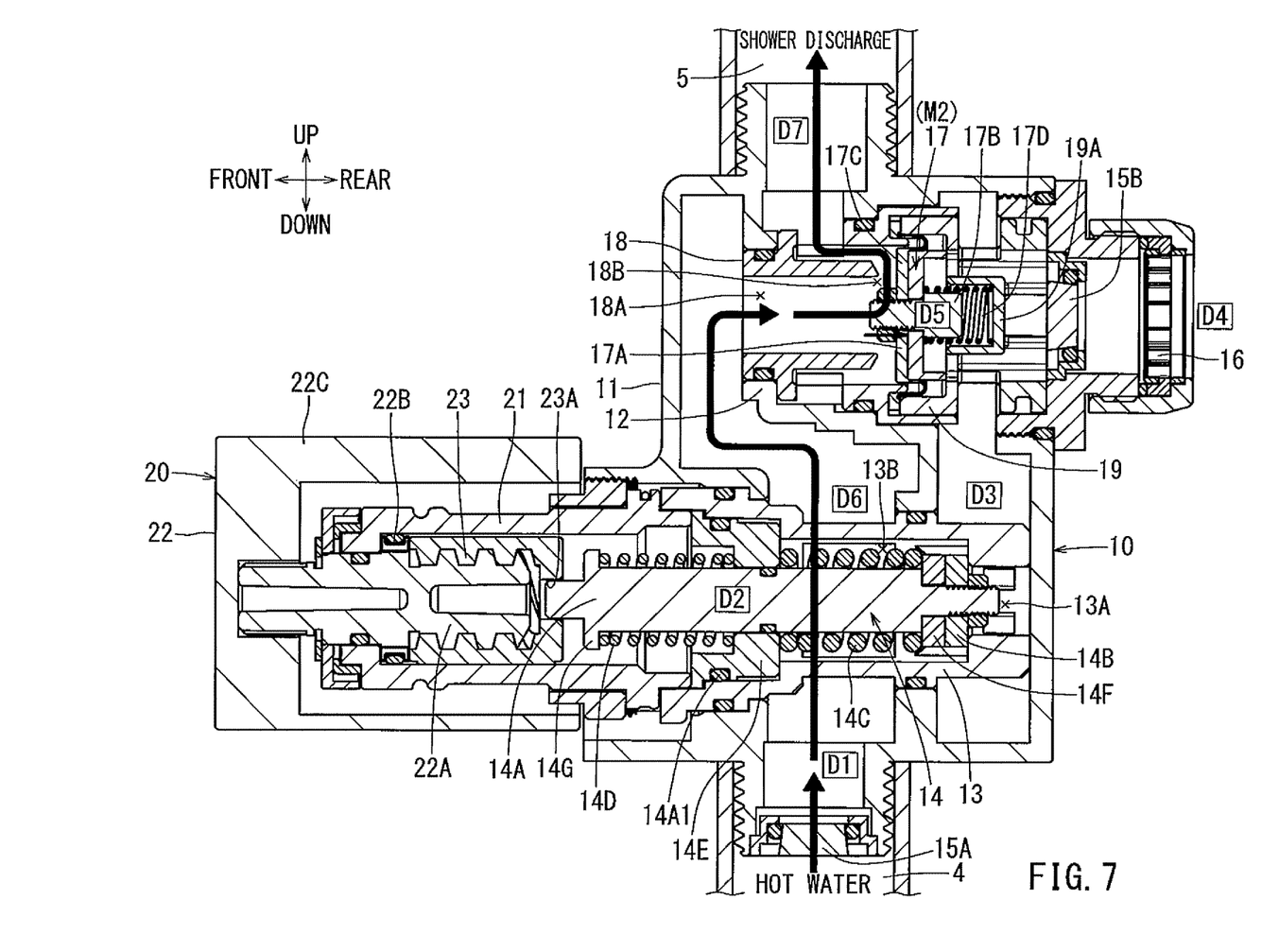
FIG. 7 is a cross-sectional view corresponding to FIG. 3 illustrating a state of each valve during hot water supply.

As shown in FIG. 4, the branch flow channel D2 may be formed using a round tubular branch pipe 13 with its pipe axis direction oriented in the frontward/rearward direction. The branch pipe 13 may include a first opening (a pipe axis opening) 13A and a second opening (a pipe wall opening) 13B. As shown in FIG. 6, the first opening 13A is located at a rear end of the branch pipe 13 and includes an opening at a peripheral wall, which is in communication with a cold water discharge flow channel D3. As shown in FIG. 7, the second opening 13B may be located in the center area between the front and rear of the branch pipe 13 and have an opening in communication with the discharge flow channel D6 and an opening in communication with the supply port D1 in the lower wall.

As shown in FIG. 7, the second opening 13B may be located directly above the supply port D1. The second opening 13B may serve as an intake port to take a portion of hot or cold water supplied from the supply port D1 into the branch pipe 13. More specifically, the hot or cold water flowing upward from the supply port D1 is partly taken from the second opening 13B and enters into the branch pipe 13. However, the rest of the hot or cold water passes upward of the branch pipe 13 and flows toward the discharge flow channel D6.

As shown in FIG. 4, the cold water discharge apparatus 10 may further include a temperature-sensitive first switching valve body 14, which is set in the branch pipe 13. The first switching valve body 14 may have a temperature-sensitive valve mechanism that expands and contracts autonomously in the pipe axis direction in accordance with the temperature of the hot or cold water taken into the branch pipe 13.

More specifically, the first switching valve body 14 may have a shaft portion 14A extending in the form of a round rod in the pipe axis direction and an open/close valve 14B assembled at the rear end of the shaft portion 14A, as shown in FIG. 4. Further, the first switching valve body 14 has a temperature-sensitive spring 14C, which may be made of a shaped memory alloy that exerts a spring force on the open/close valve 14B in the rearward direction, which is a valve closing direction. Furthermore, the first switching valve body 14 has a bias spring 14D that exerts a spring force in the forward direction to open the open/close valve 14B, by acting on the shaft portion 14A.

As shown in FIG. 4, the shaft portion 14A may be axially inserted into a round tubular shaped fitting pipe 14E, which is fitted into the branch pipe 13 from the front. With this insertion, the shaft portion 14A is supported from the outer peripheral side by the inner peripheral surface of the fitting pipe 14E, such that only a sliding movement in the pipe axis direction is allowed.

As shown in FIG. 4, a ring-like groove may be formed on an outer peripheral portion of the shaft portion 14A supported by the fitting pipe 14E. An O-ring 14A1 made of rubber may be inserted in the groove. The O-ring 14A1 serves to seal the gap between the outer peripheral surface of the shaft portion 14A and the inner peripheral surface of the fitting pipe 14E over its entire circumference. This prevents hot and cold water flowing into the branch flow channel D2 from leaking forward through the gap between the outer peripheral surface of the shaft portion 14A and the inner peripheral surface of the fitting pipe 14E.

As shown in FIG. 4, the front end of the shaft portion 14A may be inserted from the rear into a through hole 23A, which may be in the form of a circular hole, of the switching operation member 20. The switching operation member 20 is assembled at the bottom of the front end of the apparatus main body 11. This insertion allows the front end of the shaft portion 14A to be supported by the inner peripheral surface of the through hole 23A of the switching operation member 20 from the outer peripheral side. The rear end of the shaft portion 14A may be inserted from the front through a flange portion 14F that projects in a disc shape in the radial direction. The rear end of the shaft portion 14A is also inserted from the front through the open/close valve 14B. The flange portion 14F and the open/close valve 14B are placed over one another in the thickness direction. The open/close valve 14B comprises a hollow disc-shaped member made of rubber.

As shown in FIG. 4, a temperature-sensitive spring 14C may be formed of a spring member wound in a coil shape. The rear end of the shaft portion 14A may be inserted from the front side through the fitting pipe 14E, and subsequently inserted into the temperature-sensitive spring 14C and the flange portion 14F. This allows the temperature-sensitive spring 14C to be positioned between the fitting pipe 14E and the flange portion 14F. The temperature-sensitive spring 14C pushes the flange portion 14F rearward with the rear side of the fitting pipe 14E acting as a base, using a resilient force (spring force). The temperature-sensitive spring 14C has the property of changing its hardness in accordance with the temperature of the hot or cold water, upon contact with the hot or cold water taken into the branch pipe 13.

More specifically, as shown in FIG. 4, the temperature-sensitive spring 14C becomes stiff enough to overcome the spring force of the bias spring 14D to allow for it to extend in the pipe axis direction when the feed water taken into the branch pipe 13 is hot water at a set temperature or higher (for example, 35° C.). As a result, the open/close valve 14B is pressed against the rear end of the branch pipe 13, so as to close the first opening 13A.

On the other hand, as shown in FIG. 6, the temperature-sensitive spring 14C becomes soft enough to be press-contracted by the spring force of the bias spring 14D such that it contracts in the pipe axis direction when the feed water taken into the branch pipe 13 is cold water below the set temperature. As a result, the open/close valve 14B is pulled forward away from the rear end of the branch pipe 13 due to the spring force of the bias spring 14D, so as to open the first opening 13A.

As shown in FIG. 4, the bias spring 14D may also be formed of a spring member wound in a coil shape. The shaft portion 14A is inserted through the bias spring 14D such that the bias spring 14D is set between the front side of the fitting pipe 14E and a flange portion 14G that is formed near the front end of the shaft portion 14A. The flange portion 14G projects in a disc shape in the radial direction. As a result, the bias spring 14D pushes the flange portion 14G on the front end side of the shaft portion 14A. The bias spring 14D pushes the shaft portion 14A forward, with the front side of the fitting pipe 14E as a base, using a resilient force (spring force).

As shown in FIG. 3, the cold water discharge apparatus 10 may further include a constant flow valve 15B capable of limiting the discharge flow rate to the cold water discharge port D4 within a certain range. The constant flow valve 15B is in a region downstream of the pressure chamber D5 of the cold water discharge flow channel D3. Due to the flow rate limitation caused by this constant flow valve 15B, the pressure applied from the cold water discharge flow channel D3 to the pressure chamber D5 at the time of discharging the cold water is maintained at a certain level or more. The cold water discharge port D4 is equipped with a rectifier 16 that regulates the discharge of cold water using a combination of nets and grid-like components to prevent scattering.

As shown in FIG. 4, the cold water discharge apparatus 10 may further include a constant flow valve 15A capable of limiting the supply flow rate to the supply port D1 within a certain range. The constant flow valve 15A is positioned at the supply port D1, which is connected to the shower supply pipe 4. Due to the flow rate limitation by this constant flow valve 15A, the discharge flow rate to the shower discharge pipe 5 is maintained within a certain range.

As shown in FIG. 5, the cold water discharge apparatus 10 may be further provided with a diaphragm type second switching valve body 17 that extends between the discharge flow channel D6 and the pressure chamber D5 of the cold water discharge flow channel D3. The second switching valve body 17 may be configured to be switched into three modes, such as a cold water discharge mode M1 shown in FIG. 6, a hot water discharge mode M2 shown in FIG. 7, and a residual water discharge mode M3 shown in FIG. 8. These modes may be switched in response to the flow channel switching operation by the first switching valve body 14.

More specifically, as shown in FIG. 6, the second switching valve body 17 may enter the cold water discharge mode M1, in which the discharge flow channel D6 is closed due to the pressure of cold water flowing through the cold water discharge flow channel D3, when cold water is taken into the branch pipe 13 and flows into the cold water discharge flow channel D3. Further, as shown in FIG. 7, the second switching valve body 17 may enter the hot water discharge mode M2, in which the discharge flow channel D6 is opened due to the pressure of hot water flowing through the discharge flow channel D6, when hot water is taken into the branch pipe 13 and flows into the discharge flow channel D6.

Figure 8:
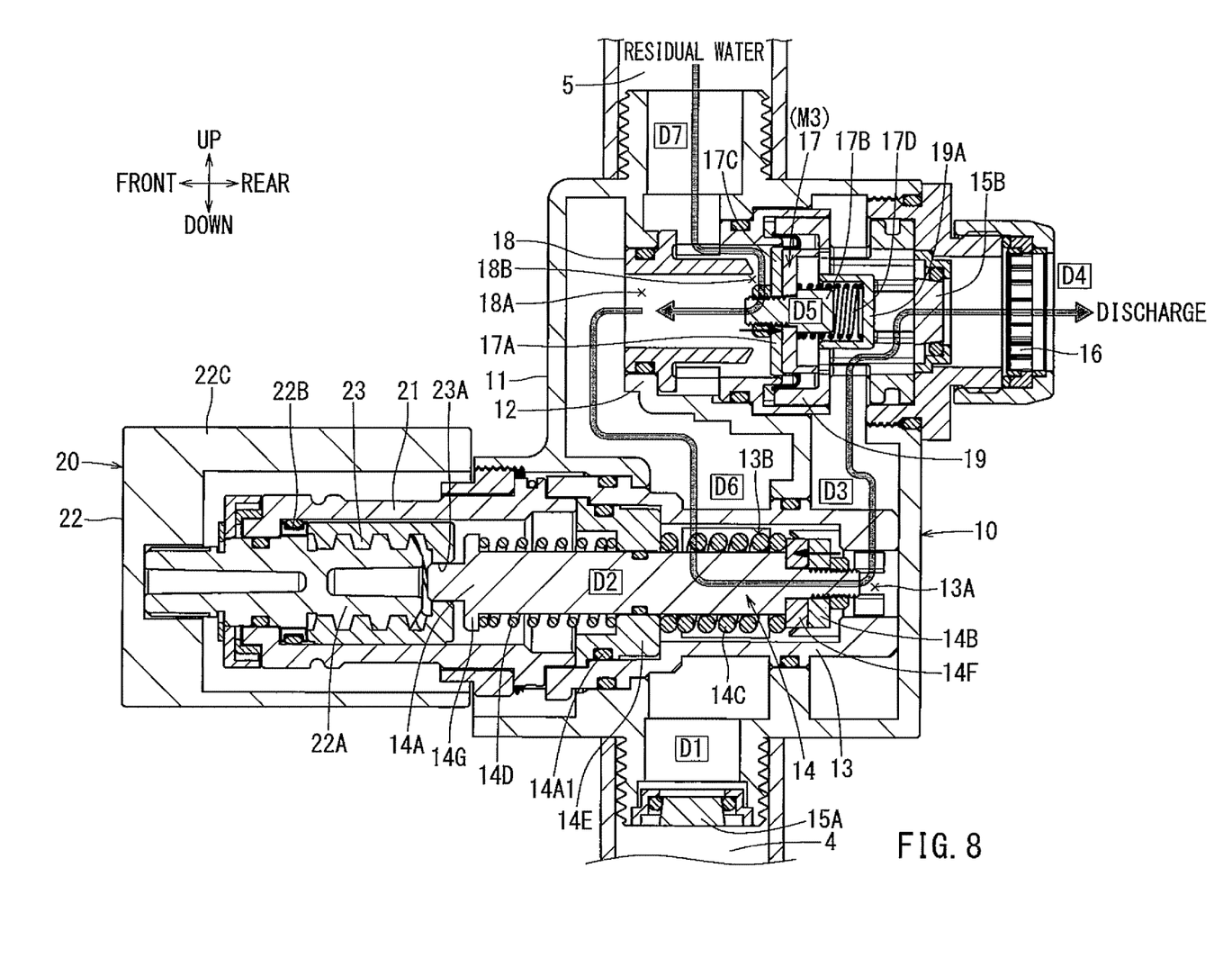
FIG. 8 is a cross-sectional view corresponding to FIG. 3 illustrating a state of each valve during residual water discharge.

Further, as shown in FIG. 8, the second switching valve body 17 may enter the residual water discharge mode M3, in which the discharge flow channel D6 is opened upon being subjected to the falling pressure of the downstream residual water from the outlet port D7 due to gravity and in which the first opening 13A (cold water discharge flow channel D3) is opened by the first switching valve body 14, when the residual water remaining in the branch pipe 13 after stopping water has cooled down and becomes cold water below the preset temperature. As a result, the residual water downstream of the outlet port D7, via the first switching valve body 14, is discharged from the cold water discharge flow channel D3 to the cold water discharge port D4.

As shown in FIG. 5, the second switching valve body 17 may be positioned within the partition pipe 19, which may be in the form of a round tube. The partition pipe 19 defines the pressure chamber D5 of the cold water discharge flow channel D3. Specifically, the second switching valve body 17 may include a disc-shaped pressure receiving plate 17A with a surface oriented to the pipe axis direction. The second switching valve body 17 may also include a shaft portion 17B extending in the pipe axis direction passing through the center of the pressure receiving plate 17A. The second switching valve body 17 may further include a diaphragm valve 17C joined to the front surface of the pressure receiving plate 17A in an overlapping manner. Still further, the second switching valve body 17 may have a pressure control spring 17D that exerts a spring force on the pressure receiving plate 17A in the forward direction, which is the valve closing direction.

As shown in FIG. 5, the pressure receiving plate 17A may have an extending portion that projects rearward from the outer peripheral edge thereof in a cylindrical shape. The pressure receiving plate 17A may be set so as to be loosely fitted in the piping of the partition pipe 19. As a result, the pressure receiving plate 17A may be supported from the outer peripheral side by the partition pipe 19, such that only a sliding movement in the pipe axis direction is allowed.

As shown in FIG. 5, the diaphragm valve 17C may be made of a rubber thin film member. A peripheral edge of the diaphragm valve 17C, which protrudes from the outer peripheral edge of the pressure receiving plate 17A over the entire circumference, may contact the inner peripheral wall of the partition pipe 19 over the entire circumference. As a result, the diaphragm valve 17C completely partitions the discharge flow channel D6 and the pressure chamber D5.

As shown in FIG. 5, the pressure control spring 17D may include a spring member wound in a coil shape. The shaft portion 17B is inserted through the front end of the pressure control spring 17D. The pressure control spring 17D may be set between the pressure receiving plate 17A and a spring support 19A fixed to the partition pipe 19. As a result, the pressure control spring 17D pushes the pressure receiving plate 17A forward, with the spring support 19A as a base, using the resilient force (spring force). Due to the spring force, the diaphragm valve 17C is pushed forward by the pressure receiving plate 17A. The diaphragm valve 17C is pushed from behind into a downstream opening 18B of a discharge relay pipe 18 provided in front thereof, so as to close the downstream opening 18B.

As shown in FIG. 6, the diaphragm valve 17C keeps the downstream opening 18B of the discharge relay pipe 18 closed (in the cold water discharge mode M1), even when cold water is taken into the branch pipe 13 and streams into the cold water discharge flow channel D3. The reason for this is that the diaphragm valve 17C is pressed forward due to the pressure of the cold water being applied to the pressure receiving plate 17A facing the pressure chamber D5 as the cold water flows through the cold water discharge flow channel D3. At this moment, the diaphragm valve 17C is subjected to the proper forward pressing force due to the flow rate limitation of the constant flow valve 15B provided in a downstream region of the cold water discharge flow channel D3.

On the other hand, as shown in FIG. 7, the diaphragm valve 17C may be pushed rearward against the spring force of the pressure control spring 17D due to the pressure of the hot water when it is allowed to flow through the discharge flow channel D6. The diaphragm valve 17C is thereby pushed rearward, away from the downstream opening 18B of the discharge relay pipe 18, to open the downstream opening 18B. As a result, the second switching valve body 17 enters the hot water discharge mode M2, in which the diaphragm valve 17C opens the discharge flow channel D6 to discharge hot water to the outlet port D7.

As shown in FIG. 5, the discharge relay pipe 18 may be formed by a round tubular pipe with its pipe axis direction oriented to the frontward/rearward direction. The discharge relay pipe 18 may have a round tubular shape which is slightly smaller than the partition pipe 19. The discharge relay pipe 18 is arranged with the rear end slightly entered in the partition pipe 19 from the front.

As shown in FIG. 7, hot water is taken into the piping from the upstream opening 18A on the front end of the discharge relay pipe 18 when the hot water flows from the supply port D1 into the discharge flow channel D6. The discharge relay pipe 18 then allows the hot water to flow downstream from the downstream opening 18B at its rear end when the feed water is hot water (and when the pressure of cold water from the cold water discharge flow channel D3 is insufficiently applied to the pressure chamber D5).

In other words, the pressure from the cold water discharge flow channel D3 is not sufficiently applied to the pressure chamber D5 when the feed water is hot water. Therefore, the diaphragm valve 17C can open, as the hot water flowing through the discharge relay pipe 18 presses the diaphragm valve 17C rearward. This allows the hot water to flow downstream from the downstream opening 18B. The hot water flowing out of the downstream opening 18B flows so as to bounce forward through the gap between the rear end of the discharge relay pipe 18 and the front end of the partition pipe 19 enclosing the rear end of the discharge relay pipe 18, with the open diaphragm valve 17C acting as a wall. The hot water is then discharged into the downstream outlet port D7.

As shown in FIG. 3, the cold water discharge apparatus 10 may further include a switching operation member 20 at the bottom of the front end. The switching operation member 20 can be operated externally by the user to switch the cold water discharge function to an inactive state. As shown in FIG. 4, the switching operation member 20 may include a round tubular shaped connecting pipe 21 with its pipe axis direction oriented in the frontward/rearward direction. The switching operation member 20 may also include an operation handle 22 in a cylindrical container shape rotatably connected to the connecting pipe 21. The switching operation member may further include a cylindrical slider 23, which is slidable in the pipe axis direction within the connecting pipe 21 by operation of the operation handle 22.

As shown in FIG. 4, the rear end of the connecting pipe 21 is connected to the front end of the branch pipe 13. The connecting pipe 21 projects forward from the apparatus main body 11. The operation handle 22 may be provided in such an orientation that the bottom of the cylindrical container is oriented in the forward direction, to face where the user stands. Inside the cylinder of the operation handle 22, a feed screw shaft 22A projects in a round rod shape, rearward from the center of the bottom surface. The operation handle 22 may be set on the connecting pipe 21, so as to allow the feed screw shaft 22A to be inserted from the front into the connecting pipe 21. As a result, the operation handle 22 covers the connecting pipe 21 from the outer peripheral side.

As shown in FIG. 4, by the above-described assembly, the feed screw shaft 22A may be rotatably supported by the inner peripheral surface of the connecting pipe 21. Thereby, the operation handle 22 can be operated to rotate around and with respect to the connecting pipe 21.

As shown in FIG. 4, the slider 23 may be set within the connecting pipe 21 and may be supported from its outer peripheral side so that only a sliding movement in the pipe axial direction is allowed with respect to the connecting pipe 21. Spiral female threads are formed on the inner peripheral surface of the cylindrical portion of the slider 23. The slider 23 is screwed to male threads of the feed screw shaft 22A, which is also inserted into the connecting pipe 21. As a result, the feed screw shaft 22A causes the slider 23 to move in the pipe axis direction as the operation handle 22 is operated to rotate.

Figure 9:
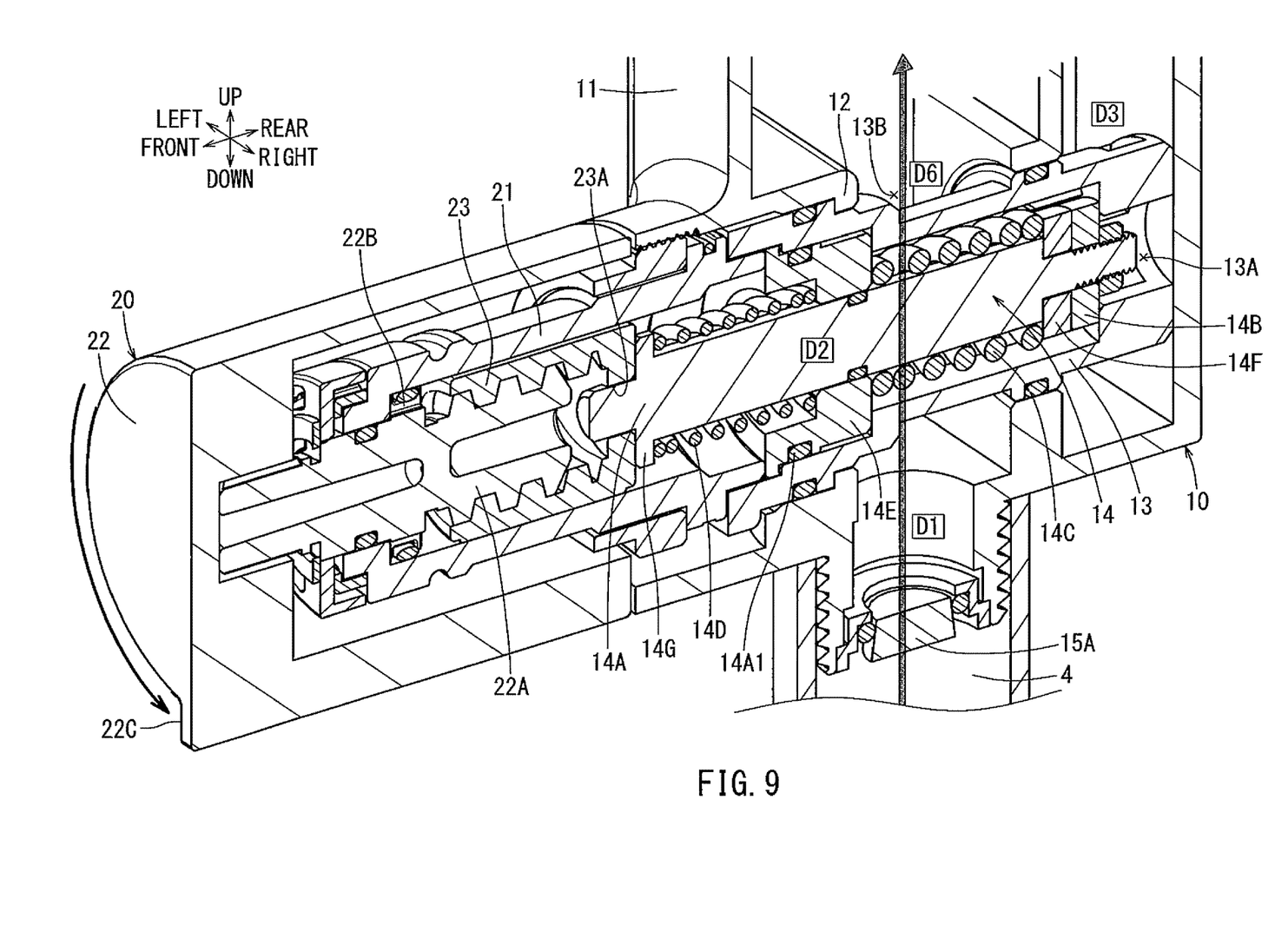
FIG. 9 is a cross-sectional view corresponding to FIG. 4 illustrating a state in which a cold water discharge function is turned off by a switching operation member.

Specifically, as shown in FIG. 9, the feed screw shaft 22A feeds the slider 23 rearward in the connecting pipe 21 due to the rotation of the operation handle 22 in a counterclockwise direction. As a result, the rear end face of the slider 23 is pressed against the front surface of the flange portion 14G of the first switching valve body 14. Subsequently, the slider 23 pushes the shaft portion 14A of the first switching valve body 14 rearward, such that the open/close valve 14B is pressed against the rear end of the branch pipe 13 so as to close the first opening 13A.

As shown in FIG. 9, this allows the first switching valve body 14 to restrict the expansion of the temperature-sensitive spring 14C in the pipe axis direction. As a result, the first switching valve body 14 ensures the first opening 13A is always closed, independent of the temperature of the water taken into the branch pipe 13. In other words, the first switching valve body 14 does not open the first opening 13A. Accordingly, the first switching valve body 14 does not allow cold water to flow to the cold water discharge flow channel D3, even if cold water flows into the branch pipe 13. Therefore, similar to that shown in FIG. 7, water flows through the discharge flow channel D6 and constantly pushes and opens the diaphragm valve 17C so as to be discharged to the outlet port D7.

Further, as shown in FIG. 4, the slider 23 is fed forward in the connecting pipe 21 in response to the feed screw shaft 22A being rotated by rotating the operation handle 22 in a clockwise direction. The rear end face of the slider 23 is thereby pulled forward and away from the flange portion 14G of the first switching valve body 14. As a result, the first switching valve body 14 is returned to a state in which the temperature-sensitive spring 14C can expand and contract in the pipe axis direction in accordance with the temperature of the hot and cold water taken into the branch pipe 13.

As shown in FIG. 4, the operation handle 22 is configured to be restricted to rotate in the clockwise direction to a position where the slider 23 abuts against a stepped portion 22B of the screw shaft 22A from behind. This prevented the screw shaft 22A from rotating when the operation handle 22 is attempted to be further rotated in the clockwise direction. A projection 22C formed on the outer peripheral surface of the operation handle 22 moves to be directly above the operation handle 22 when the operation handle 22 is rotated to the position where the clockwise rotation is restricted.

As shown in FIG. 9, by rotating the operation handle 22 in the counterclockwise direction, the slider 23 pushes the shaft portion 14A of the first switching valve body 14 rearward to close the first opening 13A. This causes the counterclockwise rotation to be restricted. The projection 22C formed on the outer peripheral surface of the operation handle 22 moves to be directly below the operation handle 22 by rotating the operation handle 22 to the position where the counterclockwise rotation is restricted. In other words, the operation handle 22 can be rotated within a 180° range, between the positions where the projection 22C is located directly above or below the operation handle 22. The cold water discharge function can be switched between an active state and an inactive state by rotating the operating handle 22.

The flow of the cold water discharge will be described with reference to FIG. 6. More specifically, the flow of the cold water discharge will be described when the feed water to be supplied to the cold water discharge apparatus 10 is below the preset temperature (for example, at 35° C.). In this case, the cold water is discharged to the cold water discharge port D4, as indicated by pale bold arrows in FIG. 6. The pale bold arrows are to schematically indicate the flow of the cold water discharge. The cold water may actually flow through the respective flow channels or openings through which the above-described arrows pass.

As shown in FIG. 6, firstly, the temperature-sensitive first switching valve body 14 opens the first opening 13A on the rear end side of the branch pipe 13. This occurs when the cold water (for example, below 35° C.) flows through the supply port D1 to the branch flow channel D2. As a result, the cold water flows from the first opening 13A to the cold water discharge flow channel D3. This water is then discharged through the cold water discharge port D4.

As shown in FIG. 6, the cold water streaming to the cold water discharge channel D3 also flows into the pressure chamber D5 and pushes the diaphragm valve 17C of the second switching valve body 17 from behind. Consequently, the second switching valve body 17 closes the downstream opening 18B of the discharge relay pipe 18. As a result, the cold water discharge apparatus 10 enters the cold water discharge mode M1.

As shown in FIG. 6, on the other hand, the cold water flowing from the supply port D1, over the branch flow channel D2, and into the discharge flow channel D6 is stopped by the discharge relay pipe 18, which is closed by the diaphragm valve 17C. As a result, the cold water is prevented from being discharged to the outlet port D7.

The flow of the hot water discharge will be described with reference to FIG. 7. More specifically, the flow of the hot water discharge will be described when the feed water to be supplied to the cold water discharge apparatus 10 is at the preset temperature or higher (for example, at or above 35° C.). In this case, the hot water is discharged to the outlet port D7, as indicated by solid bold arrows in FIG. 7. The solid bold arrows are also to schematically indicate the flow of the hot water discharge. The hot water may actually flow through the respective flow channels or openings within the respective piping through which the above-described arrows pass.

As shown in FIG. 7, firstly, the temperature-sensitive first switching valve body 14 closes the first opening 13A on the rear end side of the branch pipe 13. This occurs when the hot water (for example, 35° C. or higher) flows through the supply port D1 into the branch flow channel D2. As a result, the hot water flowing over the branch flow channel D2 to the discharge flow channel D6 exerts pressure on the diaphragm valve 17C from the front and pushes the diaphragm valve 17C to move rearward against the spring force.

As a result, the second switching valve body 17 opens the downstream opening 18B of the discharge relay pipe 18. Accordingly, the cold water discharge apparatus 10 enters the hot water discharge mode M2. Consequently, the hot water flowing through the discharge flow channel D6 is discharged through the discharge rely pipe 18 to the outlet port D7.

The flow of the residual water discharge will be described with reference to FIG. 8. More specifically, the flow of the residual water discharge will be described when the residual water remaining in the branch pipe 13 after stopping the water has cooled down and becomes cold water below the preset temperature (for example, 35° C.). In this case, the cooled residual water flows, as indicated by the pale bold arrows in FIG. 8. This residual water is discharged to the cold water discharge port D4. The pale bold arrows are to schematically indicate the flow of the discharge of the residual water. The residual water may actually flow through the respective flow channels or openings within the respective piping through which the above-described arrows pass.

As shown in FIG. 8, firstly, the temperature-sensitive first switching valve body 14 opens the first opening 13A on the rear end side of the branch pipe 13. This occurs when the residual water remaining in the branch pipe 13 after stopping the water has cooled down and becomes cold water. As a result, the residual water within the discharge flow channel D6 flows through the first opening 13A and into the cold water discharge flow channel D3, due to the action of gravity. Further, the residual water remaining downstream of the outlet port D7 exerts pressure on the diaphragm valve 17C from the front, due to the pressure caused by the gravity drop. This pressure pushes the diaphragm valve 17C to move rearward against the spring force.

As a result, the second switching valve body 17 opens the downstream opening 18B. This allows the cold water discharge apparatus 10 to enter the residual water discharge mode M3. Consequently, the residual water within the discharge flow channel D6 and the residual water downstream of the outlet port D7 flow through the first opening 13A and into the cold water discharge flow channel D3, due to the action of gravity. These sources of residual water are discharged through the cold water discharge port D4 to the outside. Therefore, even if the residual water remaining in the shower discharge pipe 5 and shower head 6 in FIG. 1 cools down over time to be cold water, it will not be spewed out on the user at the next use.

In summary, the cold water discharge apparatus 10 according to the first embodiment may be configured as follows. In the following, the reference numerals in parentheses are the reference numerals corresponding to the respective structures described in the above embodiments.

As shown in FIG. 3, the cold water discharge apparatus (10) serves to discharge hot water from the discharge flow channel (D6) to the outlet port (D7) when the feed water is hot water having a temperature equal to or higher than the preset temperature. The cold water discharge apparatus (10) serves to discharge cold water from the cold water discharge flow channel (D3), which branches off from the discharge flow channel (D6), to a cold water discharge port (D4) when the feed water is cold water having a temperature below the preset temperature. A temperature-sensitive first switching valve body (14) is provided at a branching section of the discharge flow channel (D6) and the cold water discharge flow channel (D3). A diaphragm type second switching valve body (17) is provided so as to extend over the discharge flow channel (D6) and the cold water discharge flow channel (D3). The diaphragm is biased by a spring force in a direction to close the discharge flow channel (D6).

As shown in FIG. 3, the temperature-sensitive first switching valve body (14) serves to open the cold water discharge flow channel (D3) by expanding/contracting in the pipe axis direction, in response to a change in temperature of the feed water, when the feed water is cold water. Even if the cold water discharge flow channel (D3) is open, the discharge flow channel (D6) is also kept constantly open. The first switching valve body (14) closes the cold water discharge flow channel (D3) when the feed water is hot water. A diaphragm type second switching valve body (17) can be switched between a hot water discharge mode (M2), a cold water discharge mode (M1), and a residual water discharge mode (M3).

As shown in FIG. 7, in the hot water discharge mode (M2), the discharge flow channel (D6) opens due to the pressure caused by flow of the hot water through the discharge flow channel (D6), so that the hot water is discharged to the outlet port (D7). As shown in FIG. 6, in the cold water discharge mode (M1), the discharge flow channel (D6) closes due to the pressure caused by the flow of the cold water through the cold water discharge flow channel (D3), so that the cold water is discharged to the cold water discharge port (D4). As shown in FIG. 8, in the residual water discharge mode (M3), the cold water discharge flow channel (D3) opens when the temperature of the residual water in the first switching valve (14) after stopping the water is below the preset temperature. Consequently, the discharge flow channel (D6) opens by being subjected to pressure due to the gravity drop from the residual water on the downstream side of the outlet port (D7). As a result, the residual water is discharged through the cold water discharge flow channel (D3).

With the above structure, since the first switching valve body (14) allows the discharge flow channel (D6) to be constantly open, a wide discharge flow channel (D6) can be ensured. Further, although the configuration allows the discharge flow channel (D6) to be closed by the second switching valve body (17) when the feed water is cold water, the discharge flow channel (D6) can be rationally opened when discharging the cooled residual water within the cold water discharge apparatus (10). With this rationalization of the valve mechanism, it is possible to obtain a structure capable of appropriately ensuring the hot water discharge rate and the cold water discharge rate, while preventing the cold water discharge apparatus (10) from increasing in size.

As shown in FIG. 4, the branching section comprises a branch pipe (13) that takes a portion of the feed water flowing from the feed water supply port (D1) into the discharge flow channel (D6) and allows it to be branched to the cold water discharge flow channel (D3). With the above-structure, a constantly opened discharge flow channel (D6) can be ensured to be wide.

As shown in FIG. 5, the constant flow valve (15B) may be provided in an area downstream of the pressure chamber (D5) of the second switching valve body (17) and in the cold water discharge flow channel (D3). With the above-structure, the discharge flow channel (D6) can be appropriately closed by appropriately exerting pressure on the pressure chamber (D5) side of the second switching valve body (17) by the constant flow valve (15B) when discharging cold water.

Although the above has been described with reference to one embodiment, the present disclosure may be carried out in various forms, examples of which will be described below as alternatives to the above-described embodiment.

The cold water discharge apparatus according to the present disclosure shall not be limited to the one provided on a channel for supplying hot or cold water configured to connect a combination faucet to an overhead type shower head. For example, the cold water discharge apparatus may be the one provided on a channel for supplying hot or cold water configured to connect a combination faucet to a handheld type shower head or a spout. Further, the cold water discharge apparatus may be connected to a combination faucet that is installed in a location other than a wall surface of a bathroom, such as a kitchen or sink.

The temperature-sensitive first switching valve body may be configured to be provided with an expansion and contraction direction (the pipe axis direction) oriented in the height direction after the cold water discharge apparatus is installed. The diaphragm-type second switching valve body may similarly be configured with a movable direction oriented in the height direction after the cold water discharge apparatus is installed. The expansion and contraction direction of the first switching valve body and the movable direction of the second switching valve body need not necessarily be parallel to each other, but may be arranged in an orientation in a mutually twisted relationship.

The discharge flow channel may be configured to be fluidly connected to the branch flow channel provided with the first switching valve body in the pipe axis direction. Further, the cold water discharge flow channel may be configured to be fluidly connected to the branch flow channel provided with the first switching valve body in a direction orthogonal to the pipe axis direction. Moreover, it may be configured such that the entire feed water supplied from the supply port flows to the discharge flow channel through the first switching valve body.

The supply port and the outlet port may be arranged not in line with each other. The supply port, the outlet port, and the cold water discharge port may be provided so as to open in any direction, irrespective of how the cold water discharge apparatus is installed.

The temperature-sensitive spring of the first switching valve body may comprise a wax-type thermoelement alternative to a spring member made of a shape memory alloy wound in a coil shape. The switching temperature of the hot water discharge and the cold water discharge by the first switching valve body can be freely set by adjusting the balance of the spring force between the temperature-sensitive spring and the bias spring, and may be set at a temperature below 35° C. or higher than 35° C.

What is claimed is:

1. A cold water discharge apparatus comprising:
a first switching valve body, which is temperature-sensitive provided at a branching section of a discharge flow channel and a sold water discharge flow channel, wherein the first switching valve body is configured to open the cold water discharge flow channel by expanding/contracting in a pipe axis direction in response to feed water being below a preset temperature while keeping the discharge flow channel constantly open, and the first switching valve body is configured to close cold water discharge flow channel when the feed water is equal to or higher than the preset temperature; and
second switching valve body, which is a diaphragm type valve, provided so as to ad between the discharge flow channel and the cold water discharge flow channel, the second switching valve body being biased by a spring force in a direction to close the discharge flow channel, wherein the second switching valve body can be switched between:
a hot water discharge mode, in which the discharge flow channel opens due to pressure caused by flow through the discharge flow channel, which is then discharged to the outlet port;
a cold water discharge mode, in which the discharge flow channel closes due to pressure caused by flow through cold water discharge flow channel, which is then discharged to the cold water discharge port; and
a residual water discharged mode, in which the cold water discharge flow channel opens upon being subjected to pressure due to a gravity drop from residual water on a downstream side of the outlet port when the temperature of the residual water in the first switching valve body is below the preset temperature after stopping the flow, thereby allowing the residual water to be discharged through the cold water discharge flow channel.

2. The cold water discharge apparatus as defined in claim 1, wherein the branching section is formed by a branch pipe configured to take in a part of the feed water flowing from a supply port of the feed water to the discharge flow channel and configured to branch off to the cold water discharge flow channel.

3. The cold water discharge apparatus as defined in claim 1, wherein a constant flow valve is provided in a region downstream of a pressure chamber of the second switching valve body, the pressure chamber being in the cold water discharge flow channel.

4. The cold water discharge apparatus as defined in claim 1, further comprising a slider configured to prevent the first switching valve from moving in the pipe axis direction, regardless of the temperature of the feed water.

5. The cold water discharge apparatus as defined in claim 4, wherein the slider is configured to prevent the second switching valve body from entering into the cold water discharge mode.

6. The cold water discharge apparatus as defined in claim 4, wherein the slider is configured to prevent the second switching valve body from entering into the residual water discharge mode.

7. A cold water discharge apparatus, comprising:
a supply port;
an outlet port;
a cold water discharge port; and
a first switching valve body provided at a branching section of a discharge flow channel, which fluidly communicates the water supply port with the water outlet port, and a cold water discharge flow channel, which fluidly communicates the water supply port with the cold water discharge port, wherein:
the first switching valve body is configured to be in a cold water discharge state, in which the discharge flow channel and the cold water discharge flow channel are open, or in a hot water discharge state, in which the discharge flow channel is open and the cold water discharge flow channel is closed, depending on a temperature of a flow in the branching section; and
the first switching valve body is in the cold water discharge state when the temperature of the flow in the branching section is below a preset temperature and is in the hot water discharge state when the flow in the branch section is equal to or greater than the preset temperature.

8. The cold water discharge apparatus as defined in claim 7, wherein at the branching section, the discharge flow channel and the cold water discharge flow channel are perpendicular to each other.

9. The cold water discharge apparatus as defined in claim 7, further comprising a second switching valve body positioned between the discharge flow channel and the cold water discharge flow channel and positioned away from the branching section.

10. The cold water discharge apparatus as defined in claim 9, wherein:
the second switching valve body is configured to be in the cold water discharge state, in which it interrupts the discharge flow channel and does not interrupt the cold water discharge flow channel; and
the second switching valve body is configured to be in the hot water discharge state, in which it interrupts neither the discharge flow channel nor the cold water discharge flow channel.

11. The cold water discharge apparatus as defined in claim 10, wherein:
the second switching valve body is in the cold water discharge state when a pressure on a side of the second switching valve body nearer the cold water discharge flow channel is equal to or greater than a pressure on a side of the second switching valve body nearer the discharge flow channel, and
the second switching valve body is in the hot water discharge state when the pressure on the side of the second switching valve body nearer the discharge flow channel is greater than the pressure on the side of the second switching valve body nearer the cold water discharge flow channel.

12. The cold water discharge apparatus as defined in claim 10, wherein when the first switching valve is in the cold water state and the second switching valve is in the hot water state, a residual discharge flow channel, which allows a flow from the discharge flow channel into the cold water discharge flow channel, is opened.

13. The cold water discharge apparatus as defined in claim 7, further comprising a slider configured to prevent the first switching valve from being in the cold water discharge state, regardless of the temperature of the flow in the branching section.

14. A cold water discharge apparatus, comprising:
a supply port;
an outlet port;
a cold water discharge port;
a branch pipe having a first opening and a second opening, and
a first switching valve body provided in the branch pipe, wherein:
the first switching valve body is configured to open the first opening when a temperature within the branch pipe is below a preset temperature,
the first switching valve body is configured to close the first opening when the temperature within the branch pipe is equal to or greater than the preset temperature, and
the first switching valve body is configured to open the second opening of the branch pipe regardless of the temperature within the branch pipe.

15. The cold water discharge apparatus as defined in claim 14, wherein:
the first opening is located along a pipe axis of the branch pipe, and
the second opening is located in a wall of the branch pipe.

16. The cold water discharge apparatus as defined in claim 14, wherein the first opening fluidly communicates the supply port with the cold water discharge port.

17. The cold water discharge apparatus as defined in claim 14, wherein the second opening fluidly communicates the supply port with the outlet port.

18. The cold water discharge apparatus as defined in claim 14, further comprising a second switching valve body positioned outside of the branch pipe, the second switching valve body being configured to open a downstream opening to allow flow through the outlet port when a pressure on a side of the second switching valve nearer the downstream opening is greater than a pressure on a side nearer the cold water discharge port.

19. The cold water discharge apparatus as defined in claim 14, wherein the second opening is larger than the first opening.

* * * * *